[19] United States Patent
Urfirer

[11] Patent Number: 4,546,267
[45] Date of Patent: Oct. 8, 1985

[54] MODULAR EQUIPMENT CONNECTION
[76] Inventor: Steven Urfirer, 77 Main St., Lake Placid, N.Y. 12946
[21] Appl. No.: 569,821
[22] Filed: Jan. 11, 1984
[51] Int. Cl.⁴ .................... H01H 35/00; H05K 5/00
[52] U.S. Cl. .................................. 307/116; 361/394; 339/166 R; 455/349
[58] Field of Search ............ 307/140, 112, 113, 115, 307/116; 361/393–396; 339/17 N, 166 R, 166 T; 455/349

[56] References Cited
U.S. PATENT DOCUMENTS

| | | | |
|---|---|---|---|
| 2,947,914 | 8/1960 | Simons | 455/349 X |
| 3,054,024 | 9/1962 | Van Dillen et al. | 455/349 X |
| 4,070,628 | 1/1978 | Funabashi | 455/349 X |
| 4,229,633 | 10/1980 | Gillilan | 200/5 A X |
| 4,258,096 | 3/1981 | LaMarche | 200/5 A X |
| 4,304,973 | 12/1981 | Fenelle et al. | 200/159 B |
| 4,345,119 | 8/1982 | Latasiewicz | 200/5 A |
| 4,355,483 | 10/1982 | Korzelius | 200/5 A X |
| 4,362,911 | 12/1982 | Sears et al. | 200/5 A |
| 4,475,231 | 10/1984 | Elster | 455/349 X |

Primary Examiner—Harry E. Moose, Jr.
Assistant Examiner—Derek S. Jennings
Attorney, Agent, or Firm—Nolte, Nolte and Hunter

[57] ABSTRACT

A modular electronic system is constructed by the interconnection of modules containing individual circuits. Each module includes a set of contact pads disposed at sites which are predesignated for the interconnection of corresponding terminals in the various circuits, which terminals are to be interconnected upon assembly of the system. The contact pads are disposed on the exterior surfaces of the modules and in a predetermined arrangement so that all electric connections can be accomplished unambiguously and only upon proper alignment of the modules. Activation of individual circuits may be delayed until completion of assembly by use of a sensing circuit in each module which determines that assembly has been completed or, alternatively, a displaceable connecting plate mounted on a resilient surface may be employed for springing out of connection when the modules are displaced from each other and making connection for activation of the circuits when the modules are contiguous to each other.

8 Claims, 9 Drawing Figures

MODULAR EQUIPMENT CONNECTION

BACKGROUND OF THE INVENTION

This invention relates to the electrical interconnection of separately packaged electronic circuits and, more particularly, to the automatic interconnection of equipment of modular construction.

Electronic systems are frequently constructed of a plurality of circuits which are enclosed individually in separate cases or containers which must then be interconnected for operation of the system. As an example of such a system is a stereo receiver sound system utilized in the home. The components of the system may include the preamplifier and tuner, the channel equalizers, the power amplifier for driving the speakers, and the tape player. In addition, where television is also employed, the system may include a video cassette tape recorder. Typically, each of the foregoing components is purchased as a separate unit, each in its own case, and each having terminals to permit interconnection of the components for construction and operation of the system in the home.

A problem arises in the interconnection of the components. Numerous wires are required to be run between the terminals on the various components. Often there is confusion as to which wire is to be connected to which terminal, this resulting in an excessively long period of time to accomplish the interconnection. The wires may be unsightly and, accordingly, must be routed behind the components, or otherwise be hidden from view. And there is always the danger that an incorrectly connected wire may result in damage to a component, or in improper usage such as the reversal of right and left channels of the stereo system.

SUMMARY OF THE INVENTION

The foregoing problem is overcome and other advantages are provided by an interconnection system of the invention wherein the various components of the system are constructed in matching modular form. Each of the components includes electronic circuitry enclosed within a case having a set of external contacts located for mating with the corresponding sets of contacts on the other components. Electrical connection among the several circuits is made via these sets of contacts. The contacts may be positioned on opposite sides of the component cases, particularly the top and bottom surfaces of the cases, to permit stacking of the cases in any order. With such an arrangement, each location in the set of contacts is reserved for a specific function, with the various terminals of the circuits being coupled to the specific contacts reserved for the corresponding functions, to permit the foregoing stacking of the components in any order.

A further feature of the invention is found in a mechanism which prevents the application of electric power to the various circuits until the component cases and their respective sets of terminals are fully aligned with each other. This provides an interlock operation which ensures that proper connection is accomplished prior to electrical actuation of the circuits, so as to protect both personnel and equipment from the dangers of improper connection. The mechanism is accomplished by either one of two embodiments of the invention.

In the first embodiment, the arrangement of the contacts includes sets of reed switches and magnets, located in corresponding positions on contiguous components, whereby the magnet of one component operates the switch of the other component to activate its circuit only upon the attainment of alignment between the two components. In the second embodiment, the contiguous cases of the components are constructed with male and female interfacing surfaces which properly align the contiguous cases, this embodiment further comprising a conducting plate which is pressed against a resilient springy material to make electrical connection among terminals within one of the components as the two contiguous components are brought together. During stacking of the components, the force of gravity is sufficient to displace the conducting plate to complete the electrical circuits upon interconnection of the components. For side-by-side mounting, the components would be pressed together manually, and held in place by the friction effect of weight on the non-sliding feet of the individual components.

The connection system of the invention is applicable, not only to the foregoing stereo and video system, but also to modular equipment used in computers, laboratory bench or test equipment, and other electronic systems.

BRIEF DESCRIPTION OF THE DRAWINGS

A foregoing aspect and other features of the invention are explained in the following description taken in connection with the accompanying drawings.

DETAILED DESCRIPTION

Figure 1:
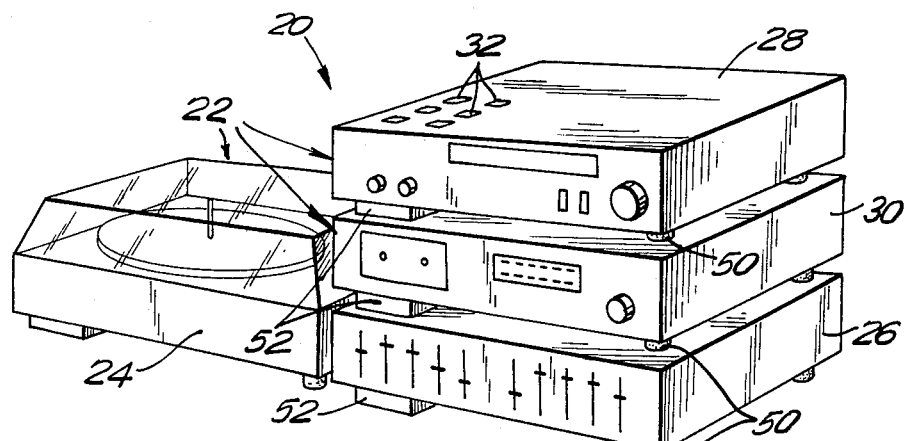
FIG. 1 is a stylized perspective view of a set of modular electronic equipment stacked with electrical interconnections being made by surface contacts in accordance with the invention.
Figure 2:
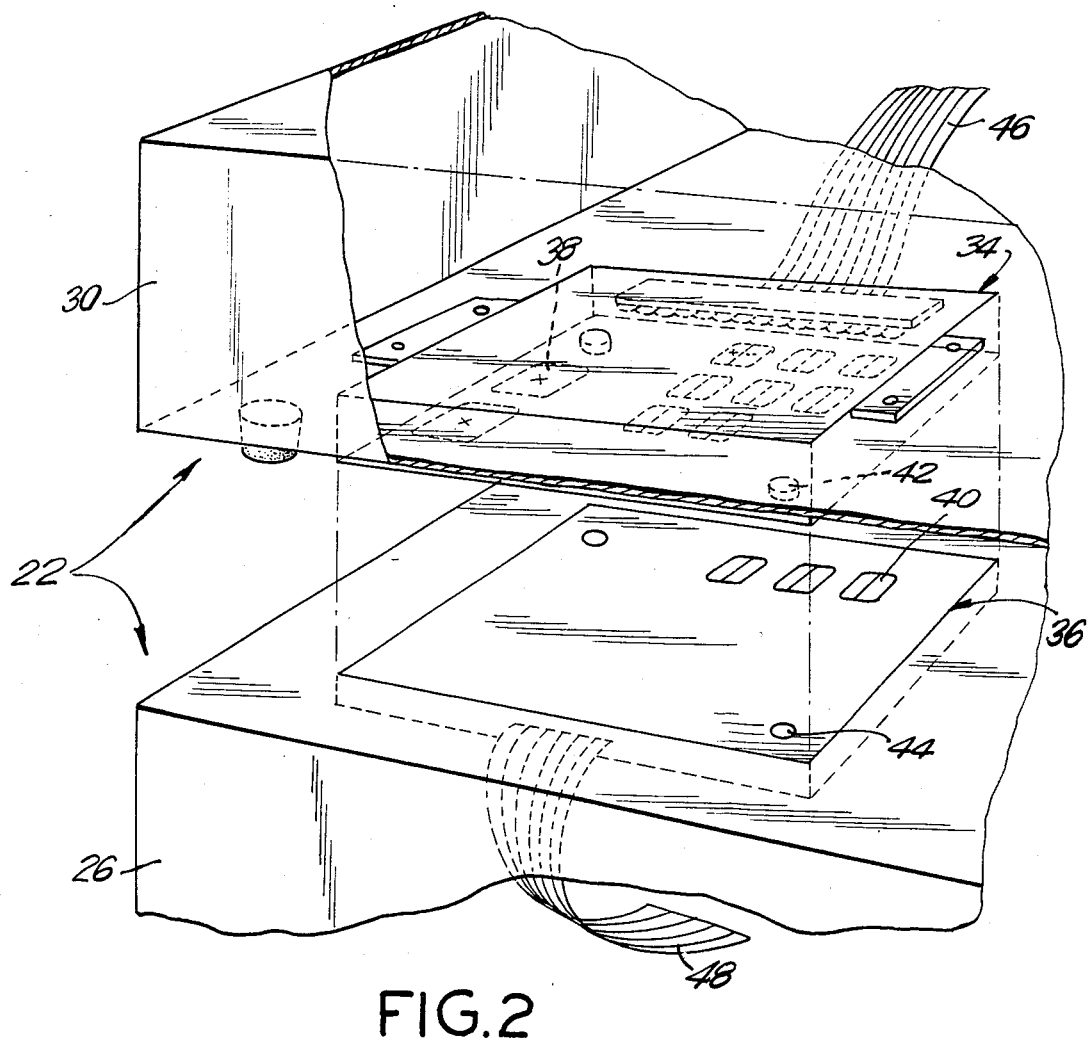
FIG. 2 is an enlarged view of a portion of two contiguous modules which are cut away to show electric circuit boards contained therein and having contact as in accordance with the invention.

With reference to FIGS. 1 and 2, there is shown an electronic system 20 which, by way of example, is portrayed as a stereo system and is constructed of a set of modules 22. By way of example, the system 20 incorporates a turntable 24 for the playing of records, an equalizer 26 for adjusting the acoustic response of recorded sounds as a function of the frequency bands, a receiver 28 for the reception of radio programs, and a power amplifier 30 for driving speakers (not shown).

In accordance with the invention, the electrical apparatus enclosed within the modules 22 are connected by contact pads which become operative upon the placement of the modules 22 contiguous to each other. By way of example, a set of contact pads 32 are shown on the upper surface of the receiver 28 at FIG. 1, it being understood that similar sets of pads (not shown in FIG. 1) are present at the corresponding locations on the upper and lower surfaces of the equalizer 26 and the power amplifier 30. Similar contacts (not shown in FIG. 1) are also located on the mating sides of the turntable 24 and the equalizer 26 to accomplish electrical interconnection therebetween. Further examples of such contact pads are shown in FIG. 2 wherein circuits 34 and 36 are shown having contact pads 38 and 40, respectively. The circuit 34 also includes magnets 42 which activate reed switches 44 located in the circuit 36. Also portrayed in FIG. 2 is an electrical cable 46 connected to the circuit 34, such cable 46 being, by way of example, a set of wires connecting with the internal operating circuitry of the individual component (i.e., left and right tape input/output, phono input, and auxiliary input, all of which are not depicted). An exemplary electric cable 48 is also shown in FIG. 2, this cable being connected to the circuit 36 and may represent, by way of example, connection with other signal source or destination circuitry (not shown) within its respective component.

In accordance with the invention, the pads 32 may be placed on any exterior surface of the modules 22, the pads 32 being positioned on opposite sides of the modules 22 so as to permit the stacking of the module 22 with the pads of one module being located in position corresponding to the pads on the next module so as to permit the interconnection of the corresponding pads 32. In the case where individual ones of the modules 22 are provided with legs 50 (FIG. 1), the module 22 includes pedestals 52 (FIG. 1) which serve as legs for holding the modules 22 in a level position, the pedestals 52 having a sufficiently wide exterior surface at the point of contact with the contiguous module 22 to permit the implacement of an array of contact pads (not shown) on the bottom of each of the pedestals 52 for mating with the corresponding pads 32 on the top surfaces of the contiguous modules 22.

Figure 3:
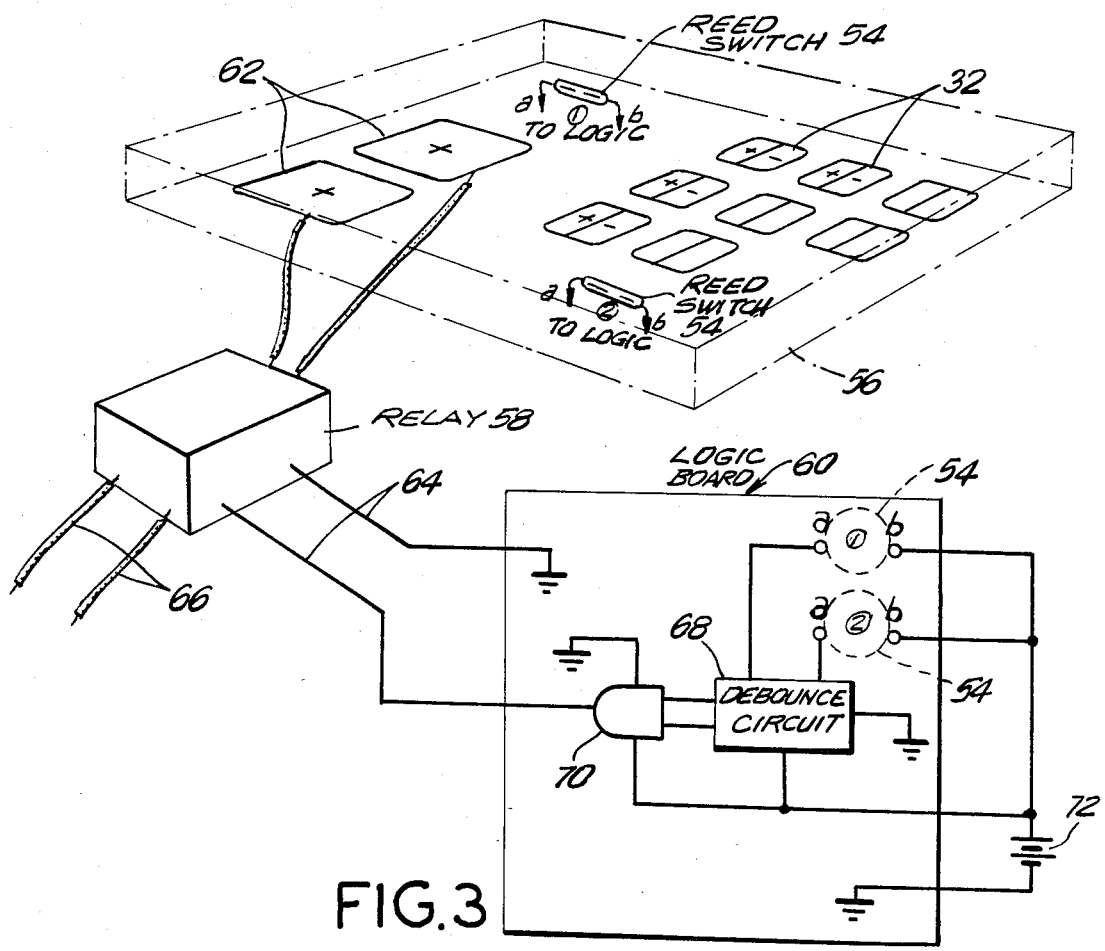
FIG. 3 shows a portion of an electric circuit board of a module of FIG. 2 which, in accordance with the invention, includes reed switches to be activated by magnets on the contiguous module and, as portrayed schematically, includes a relay and logic unit for activation of electric power.

With reference to FIGS. 2 and 3, the contact pads 32 may be of the same size or of differing sizes. Again, it is noted that the arrangement of the pads 32 in these figures is exemplary only, and that any arrangement of pads is suitable, so long as there is a corresponding arrangement of pads on a contiguous module 22 to provide for interconnection of the electric circuits of the contiguous modules. In the event that it is desired to stack the modules 22 in any order, then the arrangement of the pads must be the same in all of the modules 22 which are to be stacked, and these pads 32 must be present on opposite sides of each of the modules 22 which are to be stacked. If stacking is to be employed only in a specific order of implacement of the modules 22, then the contact pads 32 need be present only on the mating surfaces of each pair of modules 22.

One feature of the invention is an interlock mechanism which provides for the activation of electric circuits in the modules 22 only after proper alignment and contact has been made between the modules 22 and their respective contact pads 32. The contact pads 32 are fabricated of an electrically conductive material such as copper, and are oriented on an insulating surface, such as a plastic surface. To accomplish the orientation, a pair of reed switches 54 are shown located on the board of an electric circuit 56 which circuit is of the same form as the circuits 34 and 36 in FIG. 2. The switches 54 are to be activated by magnets such as the magnet 42 of FIG. 2. As shown in FIG. 2, the implacement of the magnets 42 corresponds to the implacement of the reed switches 44 so that such activation of the switches 44 automatically occurs only upon proper alignment of the circuits 34 and 36 and their corresponding modules 22, these being the equalizer 26 and the power amplifier 30 in the example of FIG. 2. Similarly, the reed switches 54 of FIG. 3 would be activated upon implacement of the circuit 56 in alignment with the circuit of a neighboring module 22.

In accordance with the feature of the invention, a relay 58 and a logic unit 60 are employed for applying electric power to contact pads 62, the outward terminals of the relay being connected to the contact pads 62 while control lines 64 for the coil (not shown) of the relay 58 are activated by the logic unit 60. Input terminal 66 to the relay 58 are connected to a source of electric power.

The two switches 54 form a part of the circuitry of the logic unit 60, the remaining portion of the circuitry including a debounce circuit 68 which may comprise well known flip-flops (not shown), and an AND gate 70. The flip-flops of the debounce circuit 68 are activated upon closures of the switches 54, which closures result in the application of logic signals to the gate 70 which, in response to the logic signals of the debounce unit 68, derives an output signal by the lines 64 to activate the relay 58. Power from a battery 72, or other suitable regulated source, DC (direct current) power is applied via the switches 54 to the circuit 68, and is also applied directly to the circuit 68 and the gate 70 as a source of power therefor. Thereby, upon closure of the switches 54 in response to the fields of magnets, such as the magnets 42, the relay 58 is activated to apply power to the circuit 56. And, as has been noted above, such power becomes applied only after the appropriate implacement of the modules 22 contiguous to each other. In the event of improper alignment, then only one or either of the two switches 54 would become closed and, accordingly, only one or either of the two logic signals would be applied to the gate 70, in which case the relay 58 would not be activated. Thereby, the logic unit 60 is able to direct the application of electric power only upon the proper alignment of the modules 22. In practice, the logic unit 60 may be incorporated as part of the circuit 56 and, also, the relay 58 may be mounted on the same board as is the circuit 56.

Figure 4:
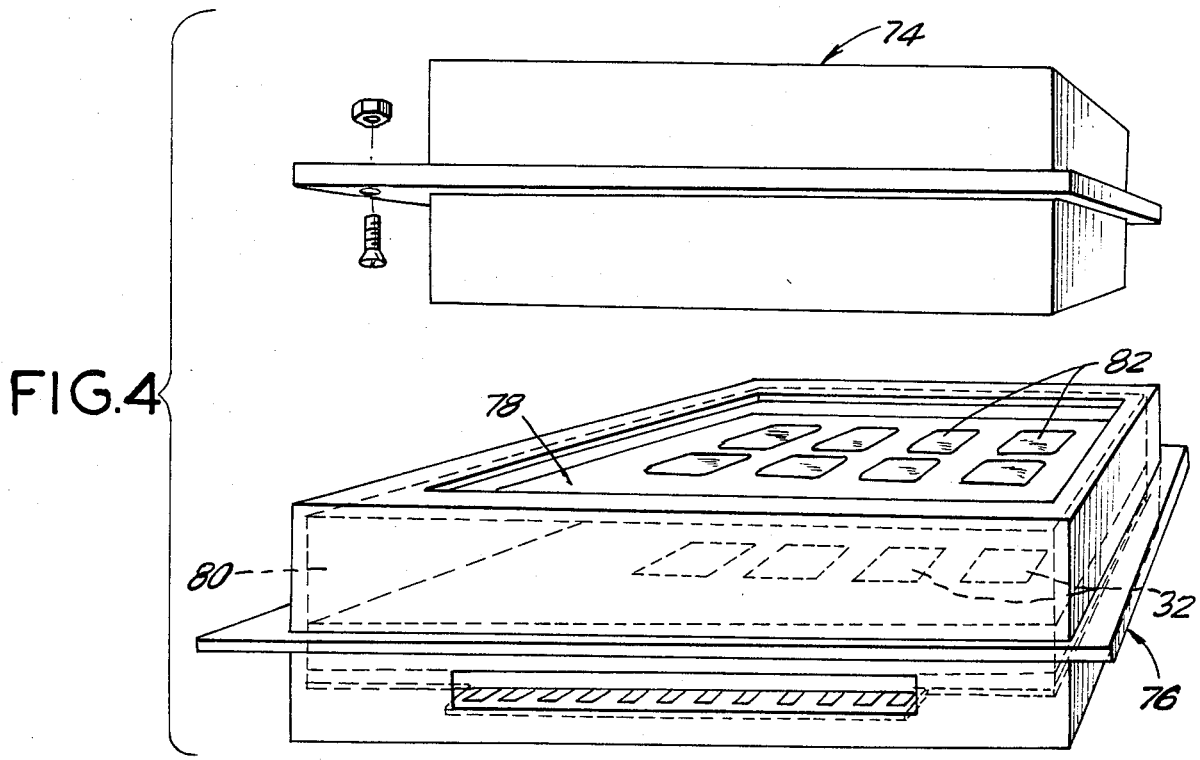
FIG. 4 shows stylized views of two modules which are to be interconnected in accordance with an alternative embodiment of the invention employing a conducting plate which is resiliently mounted for displacement against electric contacts for completion of an electrical circuit, the modules being shown spaced apart prior to interconnection.

With respect to FIG. 4, there is shown an alternative embodiment for the accomplishment of the foregoing interlock feature of disconnection of the power until such time as the appropriate modules 22 have been brought into position. In FIG. 4 there are portrayed two modules 74 and 76 which are of somewhat different form than the modules 22 of FIG. 1, the form of the modules 74 and 76 providing for a male and female interconnection, which interconnection provides both alignment of the modules and the making of electrical contact between the respective contact pads of the modules. Thus, the module 74, which is provided with the male configuration, is shown with a lower mating surface having a perimeter somewhat less than that of the mating surface of the female connection of the module 76. Upon connection of the two modules 74 and 76, the lower portion of the modules 74 fits into the upper portion of the module 76.

In this embodiment of the invention, the interlock feature of disconnection and connection of the circuits is provided by an electrically conducting plate 78 which is resiliently mounted upon foamed material 80, which material is electrically insulating and may be formed of a closed-cell plastic such as polyethylene. The plate 78 is provided with electrically conducting strips (not shown) on the underside thereof for contacting pads 32 for completing electric circuits in the module 76. On the top of the plate 78 are contact pads 82 for making electrical contact with corresponding pads (not shown) on the bottom surface of the module 74. Thus, as the module 74 is lowered onto the module 76, the electrical contact is made initially between the pads 82 and the corresponding pads on the module 74, this being followed subsequently during a further lowering of the module 74 by the completion of the electrical circuit connections in the module 76 by the contacting of metalic strips on the bottom of the plate 78 with the contact pads 32. With respect to the fabrication of the plate 78, it is noted that this plate can be fabricated of insulating material, such as a plastic, with electrically-conducting metalic strips and pads being positioned on opposite sides thereof so as to accomplish the foregoing electrical connections. In addition, conducting wires (not shown) pass through the plate 78 so as to provide electrical conduction between the pads 82 and further pads (not shown in FIG. 4) so as to complete the electrical connection between the two modules 74 and 76.

Figure 9:
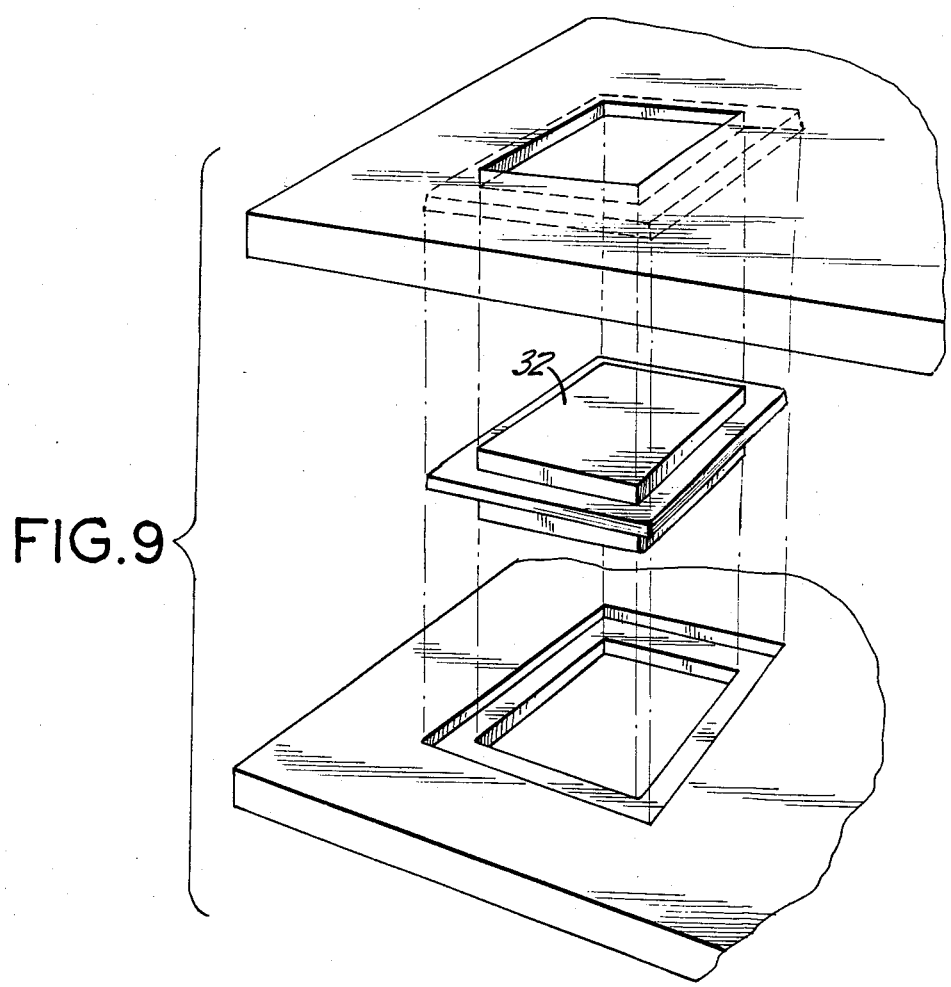
FIG. 9 is an exploded view of an enlarged cut away section of a pad 32 to show an alternative construction thereof.

A simpler alternative to the above translating plate fabrication method would be a two-piece plastic construction with single conducting plates imbedded within the bonded plastic surfaces. See FIG. 9.

Figure 5:
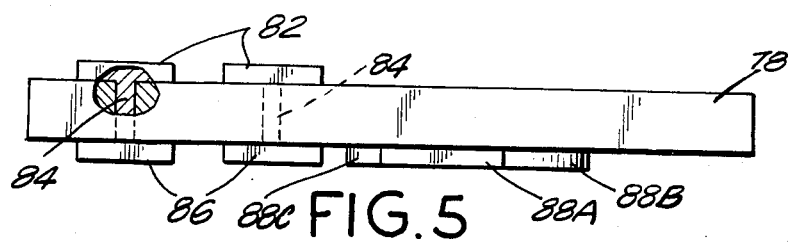
FIGS. 5 and 6 show, respectively, side and bottom views of a translatable interconnecting plate located in the lower module of FIG. 4.
Figure 6:
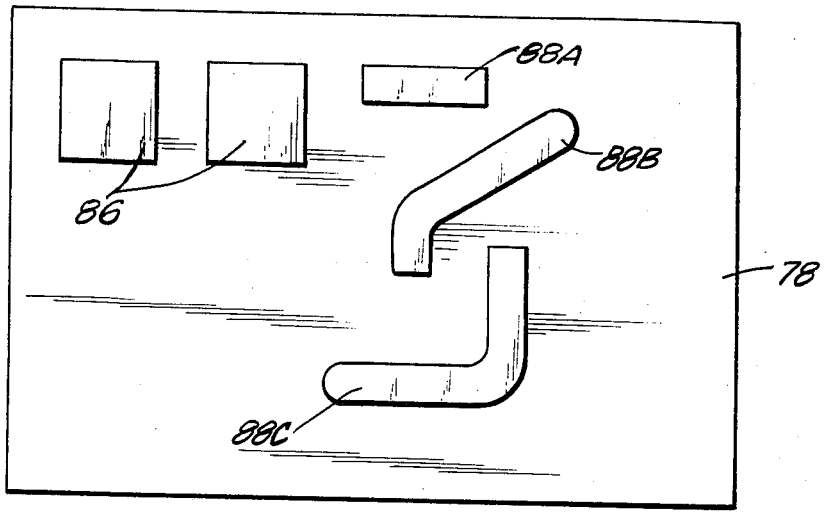

The foregoing description of the plate 78 is further described with the exemplary configuration shown in FIGS. 5 and 6. Therein, the pads 82 on the upper surface of the plate 78 are shown being connected via metalic feed-through stems 84 to contact pads 86 extending downwardly from the bottom surface of the plate 78. In FIG. 5, a portion of the plate 78 is cut away and sectioned to further show a stem 84 in its connection to a pad 82. Also shown are a set of exemplary conducting strips 88A-C disposed along the bottom surface of the plate 78 for making the forementioned interconnections between pads 32 in the module 76. It is to be understood that some of the pads 32 in the module 76 are coupled to terminals of a circuit contained within the module 76, which terminals are to be interconnected upon activation of the circuit. Other ones of the pads 32 connect with the pads 86 to provide for the interconnection between the module 76 and the module 74 for selected ones of the terminals of the circuits in the modules 76 ad 74.

Figure 7:
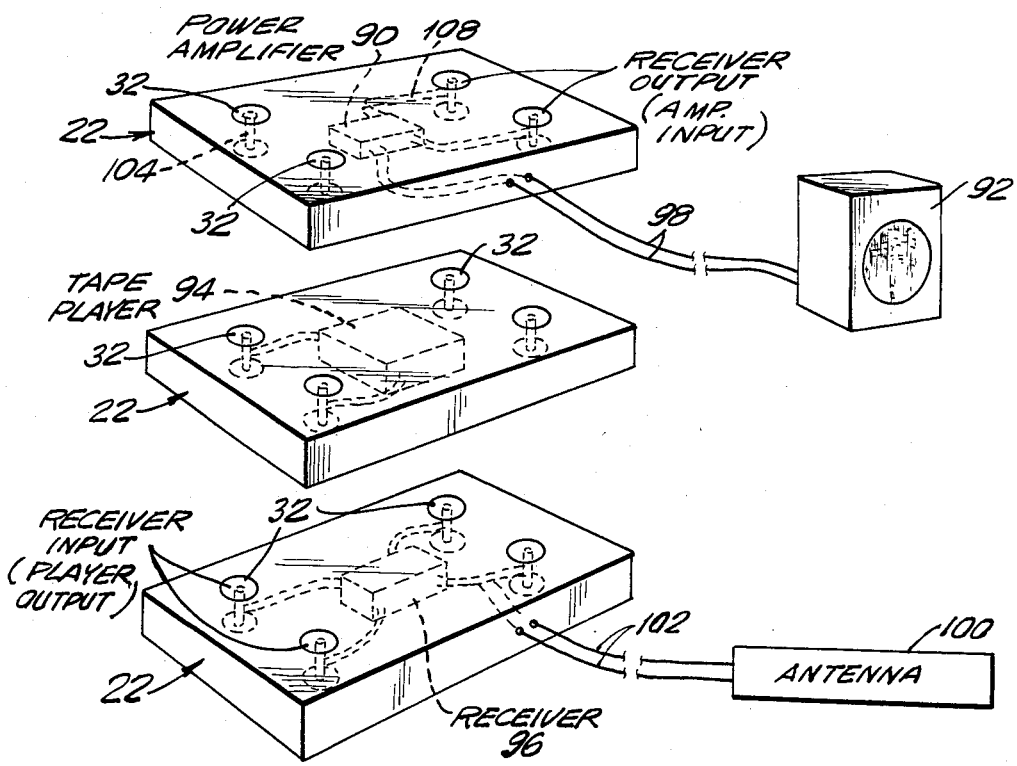
FIG. 7 is a stylized exploded view of a set of modules which are to be stacked and interconnected in accordance with the invention.

With reference to FIG. 7, there is shown a diagramatic view of a set of modules 22 having contact pads 32 arranged to permit stacking of the modules 22 in any order. The view in FIG. 7 is exploded so as to better show the corresponding arrangements of the contact pads 32 on the successive ones of the modules 22. In this example, there are three electrical functions provided by the three modules 22, the upper module including a power amplifier circuit 90 which drives a loudspeaker 92, a tape player circuit 94 in the second module 22, and a receiver circuit 96 in the third one of the modules 22. The loudspeaker 92 is located at a remote connection and connected to the upper module and the circuit 90 by wires 98. In this example, there are two sets of pads 32 provided for each of the modules 22, the left-hand set of pads 32 being reserved for interconnection between the tape-player circuit 94 and the receiver circuit 96. Thereby, the output of the player circuit 94 is connected to the input of the receiver circuit 96. Such connection is attained independently of the stacking order of the three modules 22. The left-hand pads 32 of the first module are not connected to the amplifier circuit 90, these pads 32 being reserved to assist in the interconnection of the player circuit 94 and the receiver circuit 96 in the event that a further stacking order be employed wherein the amplifier module 22 would be placed between the modules of the tape player and the receiver.

The right-hand set of pads 32 is reserved for interconnection between output terminals of the receiver circuit 96 and input terminals of the power-amplifier circuit 90. The right-hand set of pads 32 in the module 22 of the tape player are not connected to the player circuit 94, these pads 32 being reserved for the interconnection between the receiver output and the amplifier input. The receiver circuit 96 may be connected to an external antenna 100 by wires 102, such connection being independent of the arrangement of the modules 22 in the stack. It is also noted that each of the pads 32 on the upper surface of a module 22 is connected to a correspondingly positioned lower pad 32 on the lower surface of the module 22, the interconnection between the two corresponding pads being accomplished by an electrical conductor 104 as is shown in FIG. 8.

Figure 8:
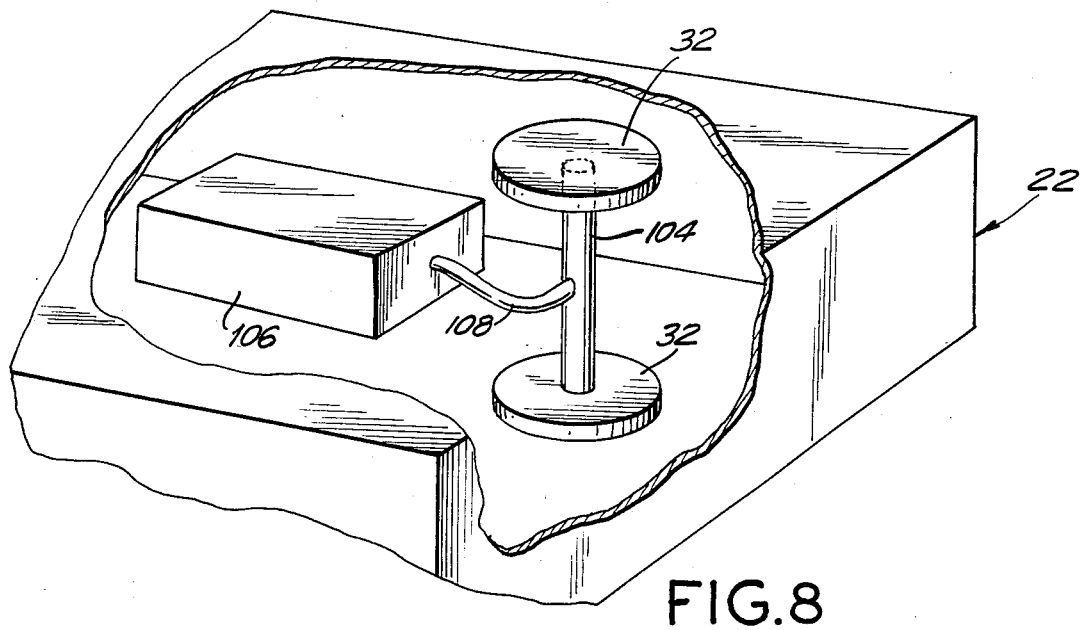
FIG. 8 is an enlarged exploded view of a portion of a module showing the interconnection of opposed contact pads.

With reference to FIG. 8, there is shown an enlarged view of a corner of one of the modules 22, the outer surface of the module 22 being broken away to show the interconnection of opposed pads 32 by the electrical conductor 104. A circuit 106 contained within the module 22 is shown connected via a lead 108 to the conductor 104 whereby electrical connection is attained between the circuit of the module 22 and a corresponding circuit in another module 22, as is disclosed in the arrangement of FIG. 7. For example, the circuit 106 of FIG. 8 may be either one of the circuits of the amplifier, the tape player or the receiver of FIG. 7.

The pads 32 in FIG. 7 would be grouped in an array within a single housing which is imbedded in the surface of module 22, top and bottom.

In view of the foregoing description of the invention, it is apparent that the invention provides for the interconnection of modules of an electronic system, wherein the modules can be stacked in any order. In addition, in accordance with further features of the invention, such interconnection can also include the interlocking of electric circuits contained within the respective modules such that no circuit becomes activated until the appropriate interconnection between that module and a neighboring module has been completed. Thereby, the interconnection of the modules to construct the entire system is readily accomplished without the use of external electrical leads, and in a manner that ensures the proper interconnection of the numerous terminals of the electric circuits contained in the modules.

It is to be understood that the above-described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A modular electronic interconnection system for the interconnection of a group of electrical apparatus constructed as separate circuits enclosed in individual cases wherein:

each of said cases has an exterior surface configured for mating with a corresponding surface of another of said cases;

each of said cases comprises a set of electrical contact pads disposed in a predetermined arrangement on said exterior surface, each contact pad being associated with a specific function of the circuit enclosed within the case;

electrical connection between the apparatus being made by placing cases of the apparatus contiguous to each other with a mating of corresponding ones of said exterior surfaces and a contacting of corresponding ones of said contact pads on each of said cases, the same predetermined arrangement of the contact pads being present in a plurality of said cases to permit interconnection of corresponding contact pads upon a mating of said exterior surfaces; said system further comprising:

interlock means in each of said cases automatically operable upon said electrical connection being made between the apparatus for then connecting individual ones of said contact pads in individual ones of said cases with terminals of the circuits contained in said cases to permit the flow of electric signals between circuits of the apparatus.

2. A system according to claim 1, wherein said predetermined arrangements of electrical contact pads is present on opposite sides of each of said cases and in each of said cases there being a portion of said set of contact pads which are connected to terminals of the circuit enclosed within the case while the unused terminals in said sets of contact pads on opposite sides of the case are connected together, so as to permit both horizontal and vertical stacking of said apparatus.

3. A system according to claim 1, wherein said interlock means comprises a switch assembly of which a first portion is disposed in the exterior surface of one of said cases and a second portion is disposed in the corresponding position of the exterior surface of a second of said cases for coacting with each other to energize the electric circuit contained in said one of said cases upon a mating of said exterior surfaces.

4. A system according to claim 3, wherein said first portion of said switch assembly is one of a reed switch and a Hall effect switch and said second portion is a magnet.

5. A system according to claim 4, wherein said interlock means further comprises a relay in said one of said cases for supplying power to the circuit of said case, and a logic circuit responsive to the operation of said reed switch or Hall effect switch for activating said relay to supply said power.

6. A system according to claim 3, wherein said first portion of said switch assembly is a movable member resiliently mounted for displacement relative to a plurality of terminals of the circuit in said one of said cases for electrically connecting said terminals upon displacement of said member, and wherein said second portion of said switch assembly pushes against said member upon a mating of said exterior surfaces.

7. A system according to claim 6, wherein comprises a recessed portion is provided in a side of said one of said cases at the side of said exterior surface, said second portion of said switch assembly protruding from the side of said second of said cases and having a peripheral edge which is configured to mate with a peripheral edge of said recessed portion in said one of said cases.

8. A modular electronic interconnection system for the interconnection of a group of electrical apparatus constructed as separate circuits enclosed in individual cases wherein:

each of said cases has an exterior surface configured for mating with a corresponding surface of another of said cases;

each of said cases comprises a set of electrical contacts disposed in a predetermined arrangement on said exterior surface, each contact being associated with a specific function of the circuit enclosed within the case;

electrical connection between the apparatus being made by placing cases of the apparatus contiguous to each other with a mating of corresponding ones of said exterior surfaces and a contacting of corresponding ones of said contacts on each of said cases, the same predetermined arrangement of the contacts being present in a plurality of said cases to permit interconnection of corresponding contacts upon a mating of said exterior surfaces; said system further comprising:

means in each of said cases for connecting individual ones of said contacts in individual ones of said cases with terminals of the circuits contained in said cases to permit the flow of electrical signals between circuits of the apparatus, said connecting means including a switch assembly of which a first portion is disposed in the exterior surface of one of the cases and a second portion is disposed in the corresponding position of the exterior surface of a second of said cases for coacting with each other to energize the electric circuit contained in said one of said cases upon a mating of said exterior surfaces, said first portion of said switch assembly being one of a reed switch and a Hall effect switch and said second portion being a magnet;

a relay in said one of said cases for supplying power to the circuit of said case; and a logic circuit responsive to the operation of said reed switch or Hall effect switch for activating said relay to supply said power.

* * * * *